May 15, 1934.  H. NUTT  1,959,036
AUTOMATIC CLUTCH
Filed Sept. 14, 1932  5 Sheets-Sheet 4
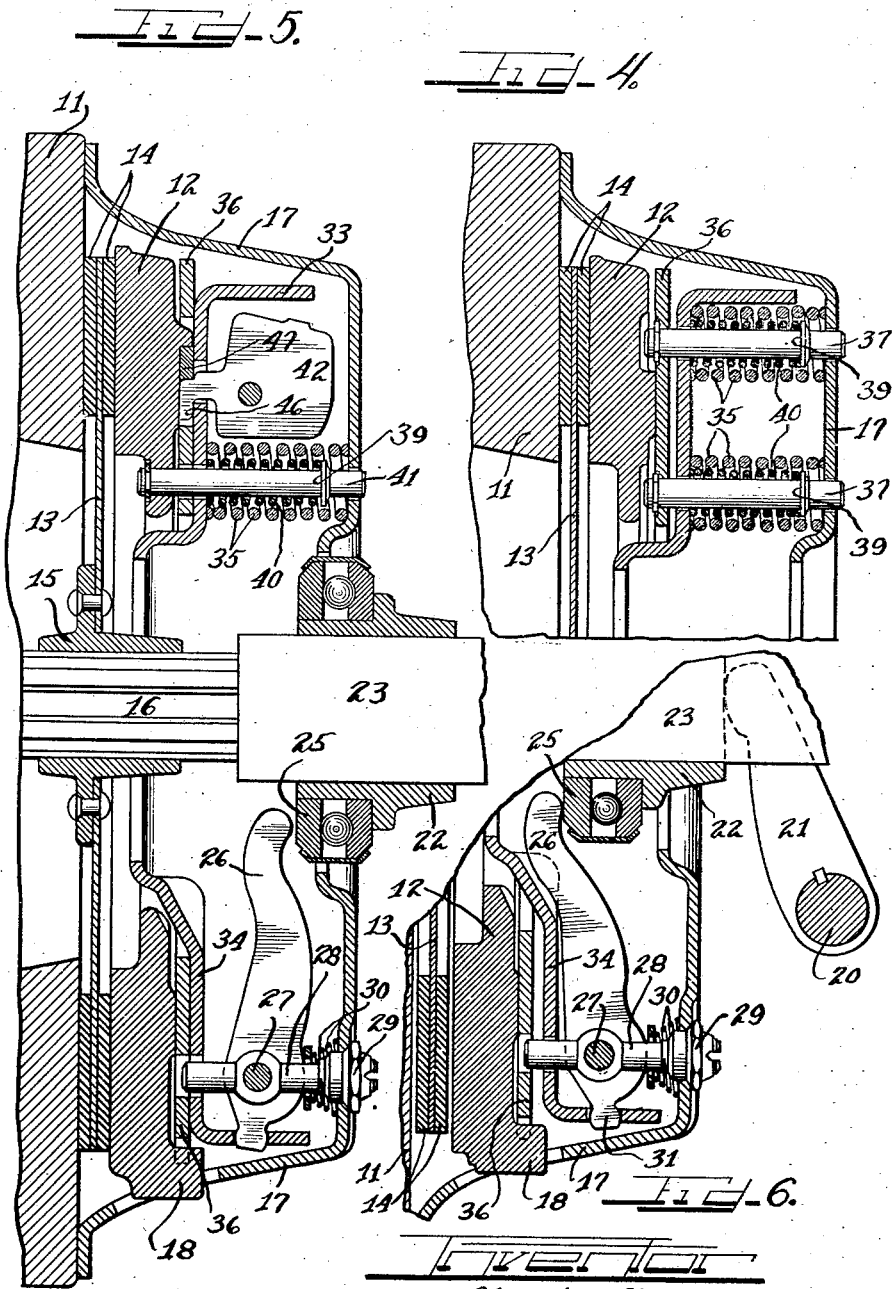
Inventor
Harold Nutt.

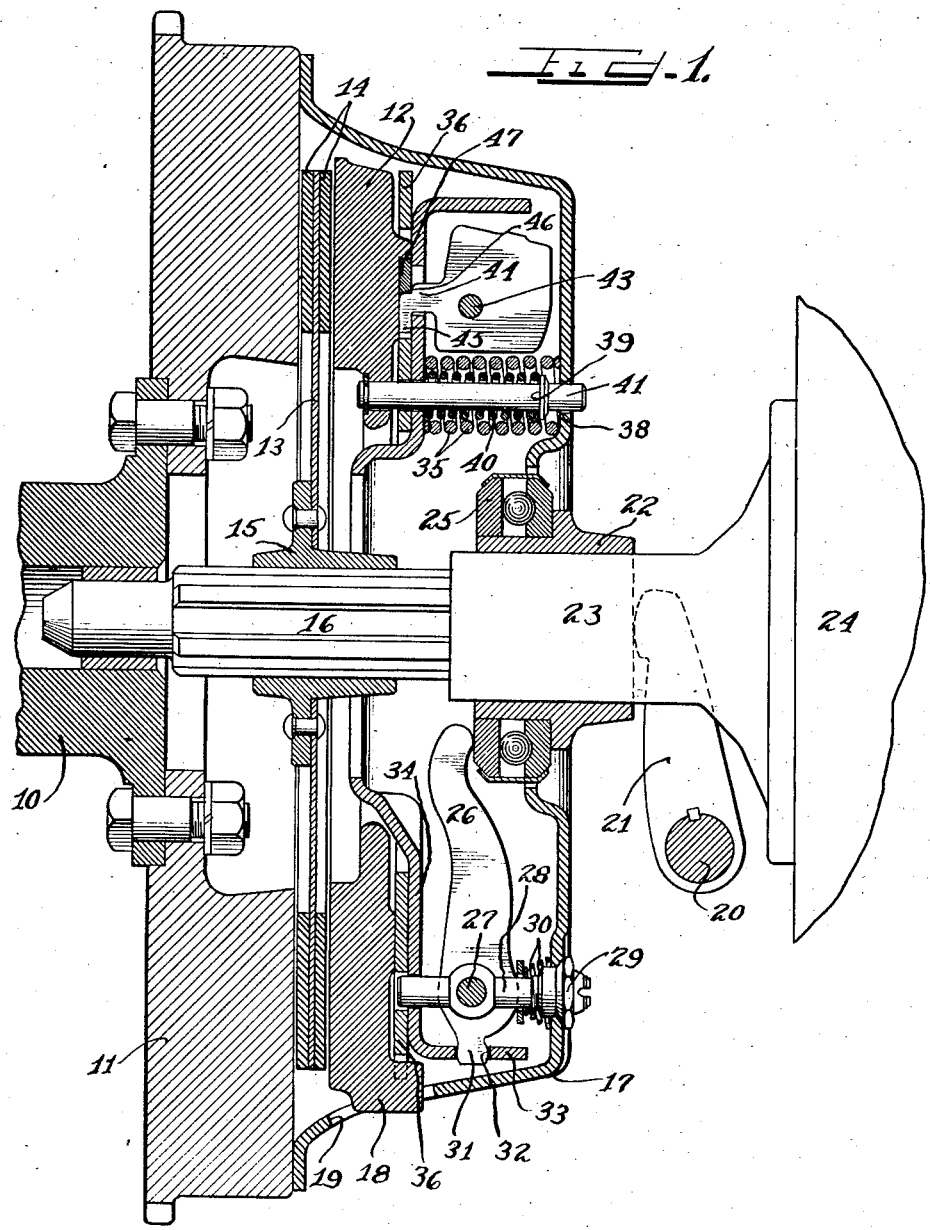

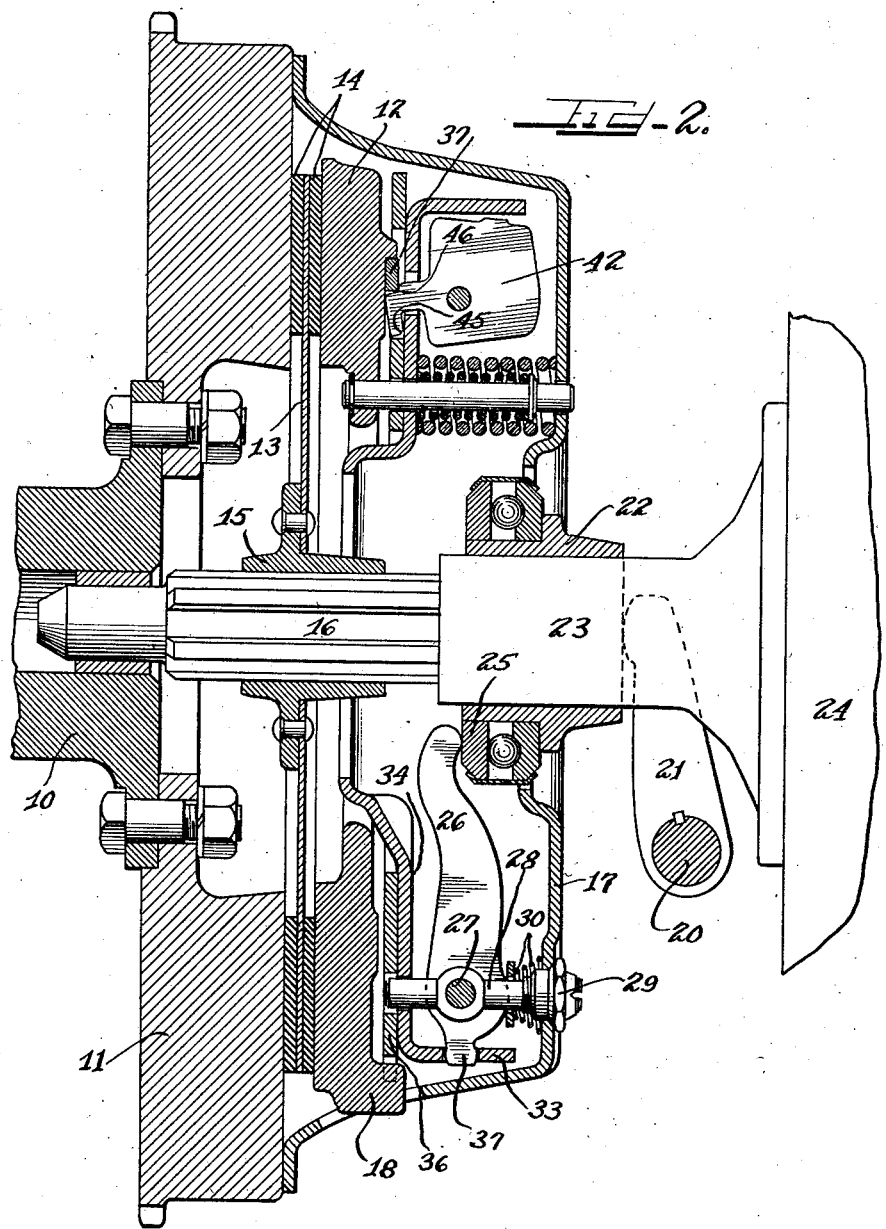

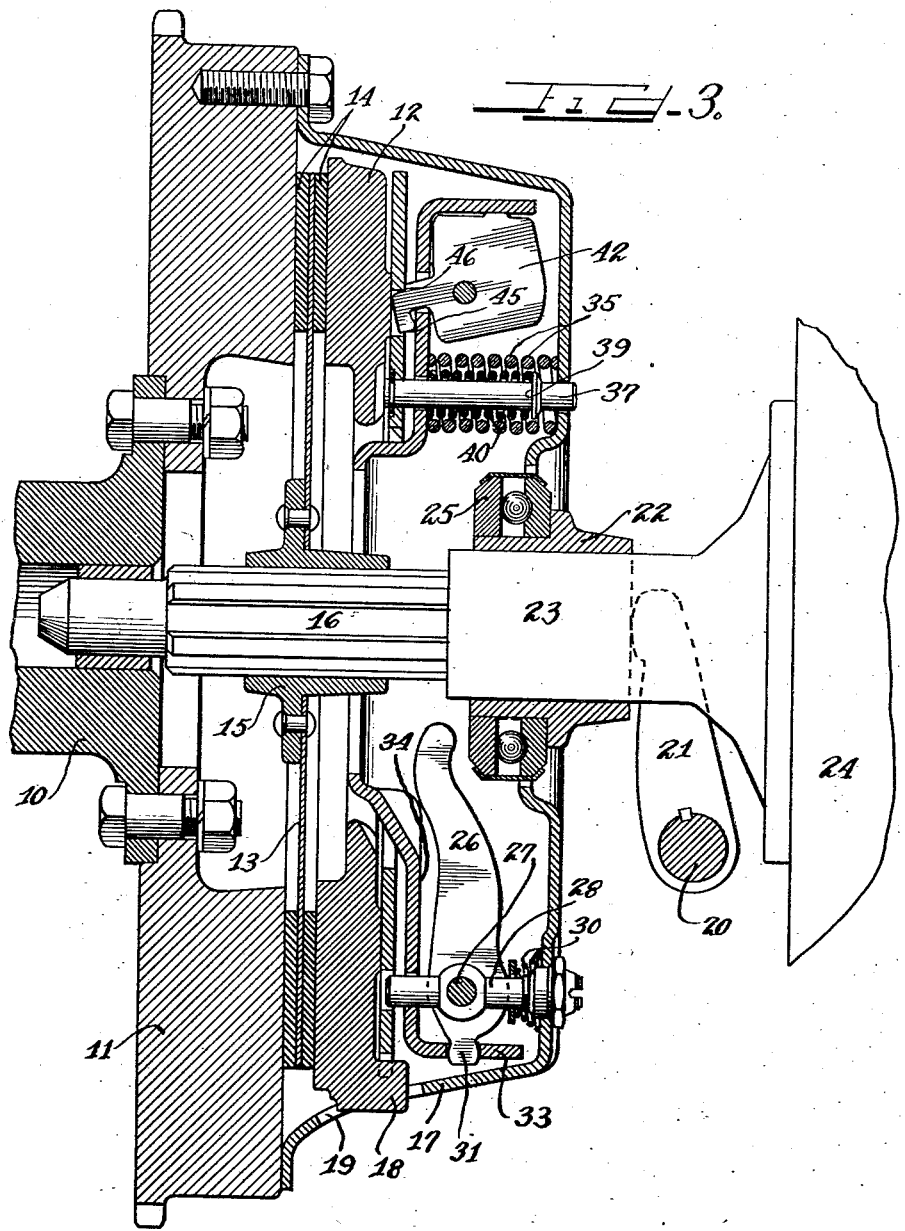

May 15, 1934.  H. NUTT  1,959,036
AUTOMATIC CLUTCH
Filed Sept. 14, 1932  5 Sheets-Sheet 5
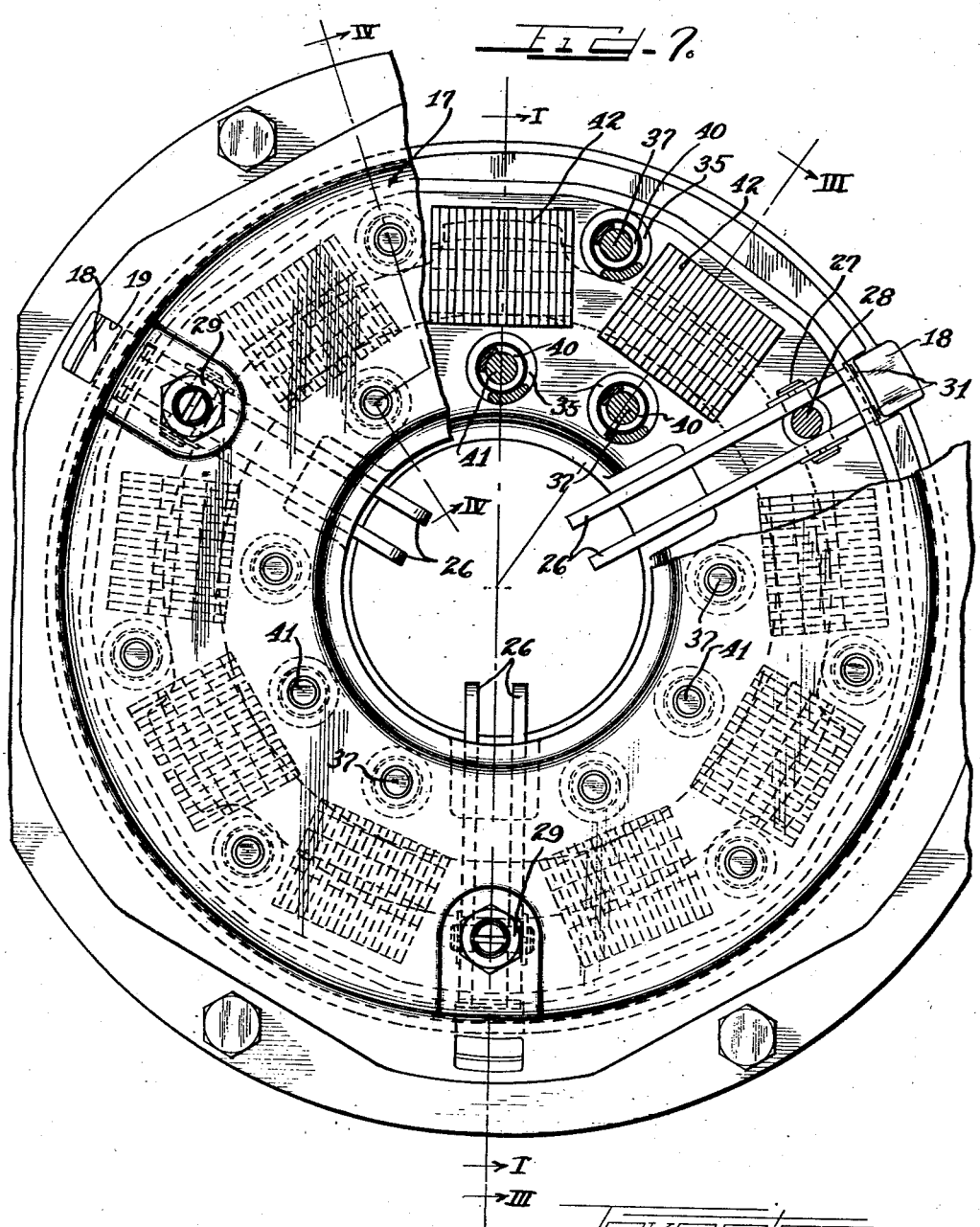

Patented May 15, 1934

1,959,036

UNITED STATES PATENT OFFICE 1,959,036

AUTOMATIC CLUTCH

Harold Nutt, Chicago, Ill., assignor to Borg & Beck Company, Chicago, Ill., a corporation of Illinois Application September 14, 1932, Serial No. 633,041

16 Claims. (Cl. 192—105)

This invention relates to automatically operating clutches of the centrifugally energized type wherein the clutch is normally automatically engaged and disengaged as the speed of the driving member is increased or decreased through a predetermined rotative speed range. While the chosen embodiment of this invention has been designed to meet the specific operating requirements of automotive clutches, it will be understood that the clutch of my invention can be used for various other purposes.

It is an object of this invention to provide an improved clutch of the class described that will normally engage and disengage automatically under the influence of centrifugal force at a predetermined rotative speed, and will yet be entirely under the operator's control for both engagement and release, the manual control being so arranged as to act through a normal clutch throwout mechanism, the manual control not being required to overcome this automatic control.

It is another object of this invention to provide an improved clutch mechanism of the class described which is entirely under the operator's control at all times, disengagement being accomplished through the medium of conventional clutch throwout bearings and fingers adapted to retract the pressure plate from engagement with the driven member, an automatic clutch engaging mechanism being provided which is adapted to operate at a predetermined speed to advance the pressure plate relative to the throwout fingers and thus cause automatic clutch engagement unless the operator compensates therefor by a further shift of the throwout mechanism.

It is a further object of this invention to provide an improved and simplified automatic clutch operating mechanism wherein centrifugal weights cause the clutch to engage at a predetermined rotative speed with a maximum predetermined yielding engaging pressure unaffected by increasing centrifugal forces above the rotative speed at which the clutch becomes fully engaged.

It is another object of this invention to provide an improved and simplified automatic clutch in which engagement occurs in a series of steps allowing a predetermined slippage range during which the clutch elements are enabled to gradually and smoothly pick up the load without developing shocks due to abrupt engagement upon a rapid acceleration of the driving member.

It is also an object of this invention to provide an improved and simplified automatically operated clutch dominated by a manual control capable of causing engagement or disengagement thereof regardless of the action of the automatic control, the manual control being normally out of contact with the clutch operating parts when the clutch is fully engaged by the automatic control.

It is still another object of this invention to provide an improved and simplified automatic clutch that can be economically manufactured and interchanged with manually operated clutches, and easily serviced to compensate for normal wear in use.

Other and further important objects of this invention will be apparent from the disclosures in the specification and the accompanying drawings.

This invention (in a preferred form) is illustrated in the drawings and hereinafter more fully described.

On the drawings:—

Figure 1 is a central vertical section through an automotive type of clutch embodying the features of this invention, the clutch being shown in its automatically disengaged position. The section shown corresponds to the line I—I in Figure 7.

Figure 2 is a section similar to that of Figure 1 but showing the clutch in the initial stage of automatic engagement.

Figure 3 is a section on the line III—III in Figure 7 showing the clutch in the fully engaged position.

Figure 4 is a fragmentary section on the line IV—IV of Figure 7 showing one of the additional pressure springs in the outer circle.

Figure 5 is a section corresponding to Figure 1 but showing the clutch manually engaged, the difference in the figures resulting from a movement to the right of the throwout bearing.

Figure 6 is a fragmentary section corresponding to the lower part of Figure 3 and showing the manual disengagement of the clutch by a movement to the left of the throwout bearing.

Figure 7 is an elevational or rear view of the clutch housing, partly broken away and with the driven shaft omitted.

As shown:

The automotive type of clutch chosen as the illustrated embodiment of this invention is of the single plate type, although it is to be understood that my invention is not limited in application to the particular service mentioned. As illustrated, an engine crankshaft 10 carries a flywheel 11, the rear face of which acts as one surface of the clutch driving member, an axially movable pressure plate 12 serving to press a clutch disc 13 against the flywheel 11. The clutch disc 13 carries the usual friction facing material 14 on both sides and is mounted on a hub 15 splined to and slidable along a transmission drive shaft 16, which shaft is the driven shaft of the clutch and will be hereinafter so referred to for convenience. The pressure plate 12 and the operating mechanism therefor is enclosed in a casing or housing 17 bolted to the rear face of the flywheel and revolving therewith, the pressure plate having outstanding lugs 18 which enter slots 19 in the housing wall to cause the pressure plate to revolve with the flywheel and housing.

The foregoing described structure corresponds to a usual form of manually operated clutch wherein the pressure plate is urged into engagement by spring pressure and is retracted to disengage the clutch, by the usual clutch throwout lever acting on a shaft 20 which carries a fork 21 acting to shift a sliding collar 22 to the left on a sleeve 23 enveloping the clutch shaft 16 and secured to the transmission case 24. The collar 22 carries a thrust bearing 25 which contacts the inner ends of throwout fingers 26 which in the usual manual clutch would be so linked directly to the pressure plate as to retract the same. In the present case the fingers do not act directly on the pressure plate, as will be described in more detail hereinafter, although their functions include the manual retraction or advance of the pressure plate at the will of the operator.

The fingers 26 are pivoted at 27 to studs 28 supported by adjustable nuts 29 seating in the housing 17. Springs 30 are positioned about the studs between the fingers 27 and the housing and serve to maintain the studs in position. Adjustment of the nuts 29 provides proper setting of the throwout fingers during manufacture to secure parallelism in the clutch elements. Thus the clutch of this invention resembles a manual clutch in many respects, and may be disengaged in the same way.

The outer ends 31 of the throwout fingers 26 are formed to engage in apertures 32 in the flange 33 of a spring mounting ring 34 which is provided within the housing, clutch pressure springs 35 being compressed between the housing and the spring ring instead of bearing directly on the pressure plate 12 as in a normal manually operated clutch. A bearing plate 36 is interposed between the spring ring 34 and the pressure plate 12 and under some conditions of operation the pressure plate, bearing plate, and spring ring are held together so that the pressure plate then moves with the spring ring, as will be described in more detail hereinafter. The action of the pressure springs 35 tends to shift the spring ring to the left and the ring in turn pulls the throwout fingers 26 clockwise, causing the inner ends of the fingers to bear against the throwout bearing. Thus if the bearing is shifted to the right as in Figure 5, the fingers are allowed to move further in the same direction and the spring ring then moves to the left to cause clutch engagement. If the throwout bearing is moved to the left as in Figure 6, it forces the spring ring to the right causing a retraction of the pressure plate even if the automatic mechanism has fully engaged the clutch. It will thus be noted that the fork 21 for operating the throwout bearing has a mid-position for normal automatic control, a movement to the left for manual disengagement, and a movement to the right for manual engagement.

There are a total of fifteen pressure springs 35, as shown in Figure 7, six of which are symmetrically disposed in pairs in an outer circle between the throwout finger studs. These springs form outer springs disposed about short studs 37 which pass through the spring ring and bearing plate and are anchored to the latter, the outer ends of the studs being guided in apertures 38 in the housing. The studs are shouldered at 39 to form spring seats for retractor springs 40 positioned within the pressure springs 35 these retractor springs serving to resiliently hold the bearing plate against the spring ring. Six more of the pressure springs 35, on the inner spring circle, contain similar short studs and retractor springs, so that twelve retractor springs act to hold the bearing plate against the spring ring. The remaining three pressure springs on the inner circle have similar retractor springs but the studs 41 therefor are longer and extend into and are anchored to the pressure plate 12 thus retracting the same. The three retractor springs acting on the pressure plate govern the first stage of automatic clutch engagement, while the twelve retractor springs acting on the bearing plate govern the second stage of automatic engagement. It will become evident hereinafter that by varying the number and strength of the springs in each group it will be possible to vary the slip range or rapidity of engagement in response to speed increases through the operating range of the automatic mechanism.

The automatic clutch operating mechanism is arranged to separate the pressure plate from the spring ring, which latter remains in a position determined by the throwout bearing except when the clutch is fully engaged by either the manual or automatic mechanism. When automatically engaged, the spring ring is shifted slightly to the right to lift the throwout fingers away from the throwout bearing, as shown in Figure 3 in order to prevent scuffing or dragging thereof and to relieve the bearing from the load when the clutch is engaged.

Automatic clutch engagement is accomplished in two stages by two sets of weights 42 so formed and mounted as to respond to centrifugal force and swing outwardly into contact with the flange of the spring ring, which flange is flattened adjacent each of the weights in order to provide a full bearing for weights assembled for straight line contact in the bearing plate. The two sets of weights are identical and may conveniently be formed by assemblies of sheet metal stampings which may be riveted together at 43 if so desired. The weights are formed with lugs 44 which extend through suitable apertures in the spring ring, the lugs having inwardly extending projections 45 which hook under the spring ring and are located between the spring ring and the pressure plate in apertures in the bearing plate. The opposite edge of the lugs are formed with shoulders 46 which bear either on the edge of the bearing plate as in Figure 3 or on hardened inserts 47 as in Figure 1. The lugs 44 resemble a boot and it will be convenient to call the projections 45 the toe thereof whereas the shoulders 46 correspond to a heel. The weights are guided by the slots in the spring ring and are limited in travel by the flange of the spring ring. When the weights swing outwardly about the heels 46 as pivots the toes 45 of the lugs tend to lift the spring ring away from the pressure plate, but since the spring ring is backed by heavy spring pressure the result is that the heels 46 shift the pressure plate and the bearing plate to the left away from the spring ring against the action of the retractor springs, bringing the pressure plate into contact with the driven disc. The clutch parts are so adjusted that full engagement occurs before the weights quite reach the spring ring flange so that the final movement of the weights, after the pressure plate is prevented from further advance, serves to slightly shift the spring ring to the right to entirely transfer the pressure spring load to the pressure plate. At the same time this slight movement of the spring ring to the right serves to withdraw the throwout fingers from the bearing.

The clutch operates in two stages, the first of which is shown in Figure 2 and is accomplished by the center weight of each group of three between the throwout fingers. The three center weights act directly against the pressure plate 12 and thus have to overcome only the three retractor springs acting on the long studs. The force of these springs determines the rotative speed of initial engagement since they act to oppose the outward movement of the weights in response to centrifugal force. Obviously, the retractor spring force can be varied to obtain any desired initial engagement speed, the preferred speed being somewhat above idling in order that the clutch may not engage until the engine accelerator pedal is depressed and the engine speed raised above idling.

The second stage of clutch operation brings the six outside weights into action between the bearing plate and the spring ring against the action of the twelve retractor springs acting on the short studs fastened to the bearing plate which is thus shifted to the left in Figure 3 until it brings up against the pressure plate. In this position, the weights of both stages have not quite reached their limit against the spring ring flange, as will be noted in Figure 2, and a further increase in rotative speed will then seat the weights against the flange to slightly shift the spring ring to the right to relieve the throwout fingers from the pressure spring load which is thus transferred to the pressure plate.

Since the first stage weights are each opposed by one retractor spring while the second stage weights are each opposed by two retractor springs it will be evident that a higher rotative speed will be required to generate sufficient centrifugal force to move the second stage weights after the first stage weights have reached the position of Figure 2. Thus the speed range between the first and second stages represents a gradual application of clutch pressure allowing sufficient slippage, after the clutch clearances have been taken up, to provide a smooth engagement free from shocks whether starting from rest or when changing gears. It will be evident that this slip range can be predetermined by suitable variations in the weights and retractor springs, and that the clutch engaging pressure is also predetermined by the pressure spring load.

It will thus be seen that I have invented an improved and simplified automatic clutch wherein the automatic control is at all times subordinate to a manual control for either engaging or disengaging the clutch and that the manual control does not have to overcome the automatic control.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An automatic clutch comprising a driving member, a driven member, a pressure plate revolving with the driving member on the opposite side of the driven member and axially movable to engage the driven member against the driving member, a housing for the pressure plate, a spring ring interposed between the pressure plate and the housing, a bearing plate interposed between the pressure plate and the spring ring, pressure springs pre-compressed between the spring ring and the housing, manually operable means for advancing or retracting said spring ring, and separate centrifugally responsive means interposed both between said spring ring and the pressure plate and between said spring ring and the bearing plate to shift the pressure plate and bearing plate away from the spring ring to force the pressure plate into engagement with the driven member over a predetermined range of rotative speeds when the manually operable means is in its neutral position.

2. An automatic clutch comprising a driving member, a driven member, a pressure plate revolving with the driving member on the opposite side of the driven member and axially movable to engage the driven member against the driving member, a housing for the pressure plate, a spring ring interposed between the pressure plate and the housing, a bearing plate interposed between the pressure plate and the spring ring, spring means acting to retract said bearing plate against said spring ring and said pressure plate against said bearing plate, pressure springs pre-compressed between the spring ring and the housing, manually operable means for advancing or retracting said spring ring, and separate centrifugally responsive means interposed both between said spring ring and the pressure plate and between said spring ring and the bearing plate to shift the pressure plate and bearing plate away from the spring ring to force the pressure plate into engagement with the driven member over a predetermined range of rotative speeds when the manually operable means is in its neutral position.

3. An automatic clutch comprising a driving member, a driven member, a pressure plate revolving with the driving member on the opposite side of the driven member and axially movable to engage the driven member against the driving member, a housing for the pressure plate, a spring ring interposed between the pressure plate and the housing, a bearing plate interposed between the pressure plate and the spring ring, pressure springs pre-compressed between the spring ring and the housing, and separate centrifugally responsive means interposed both between said spring ring and the pressure plate and between said spring ring and the bearing plate to shift the pressure plate and bearing plate away from the spring ring to force the pressure plate into engagement with the driven member over a predetermined range of rotative speeds.

4. An automatic clutch comprising a driving member, a driven member, a pressure plate revolving with the driving member on the opposite side of the driven member and axially movable to engage the driven member against the driving member, a housing for the pressure plate, a spring ring interposed between the pressure plate and the housing, a bearing plate interposed between the pressure plate and the spring ring, pressure springs pre-compressed between the spring ring and the housing, and separate centrifugally responsive means interposed both between said spring ring and the pressure plate and between said spring ring and the bearing plate to shift the pressure plate and bearing plate away from the spring ring to force the pressure plate into engagement with the driven member over a predetermined range of rotative speeds, spring means acting to retract said bearing plate against said spring ring and said pressure plate against said bearing plate.

5. An automatic clutch comprising a driven member, a driving member including a housing enveloping the driven member and containing a pressure plate movable into engagement with said driven member, spring mounting means interposed between the housing and the pressure plate, a bearing plate interposed between the pressure plate and the spring mounting means, pre-loaded pressure springs mounted between the spring mounting means and the housing and adapted to act through the spring mounting means to urge the pressure plate into clutching engagement with the driven member, manually operable means normally controlling the position of said spring mounting means, and centrifugally responsive means adapted to consecutively separate the pressure plate and the bearing plate from the spring mounting means, whereby to cause clutching engagement between the pressure plate and the driven member when the manually operable means is in a predetermined intermediate position.

6. An automatic clutch comprising a driven member, a driving member including a housing enveloping the driven member and containing a pressure plate movable into engagement with said driven member, spring mounting means interposed between the housing and the pressure plate, a bearing plate interposed between the pressure plate and the spring mounting means, yielding retracting means adapted to normally hold the pressure plate and the bearing plate against the spring mounting means, pre-loaded pressure springs mounted between the spring mounting means and the housing and adapted to act through the spring mounting means to urge the pressure plate into clutching engagement with the driven member, manually operable means normally controlling the position of said spring mounting means, and centrifugally responsive means adapted to consecutively separate the pressure plate and the bearing plate from the spring mounting means, whereby to cause clutching engagement between the pressure plate and the driven member when the manually operable means is in a predetermined intermediate position.

7. An automatic clutch comprising a driven member, a driving member including a housing enveloping the driven member and containing a pressure plate movable into engagement with said driven member, spring mounting means interposed between the housing and the pressure plate, a bearing plate interposed between the pressure plate and the spring mounting means, pre-loaded pressure springs mounted between the spring mounting means and the housing and adapted to act through the spring mounting means to urge the pressure plate into clutching engagement with the driven member, and centrifugally responsive means adapted to consecutively separate the pressure plate and the bearing plate from the spring mounting means, whereby to cause clutching engagement between the pressure plate and the driven member.

8. An automatic clutch comprising a driven member, a driving member including a housing enveloping the driven member and containing a pressure plate movable into engagement with said driven member, spring mounting means interposed between the housing and the pressure plate, a bearing plate interposed between the pressure plate and the spring mounting means, pre-loaded pressure springs mounted between the spring mounting means and the housing and adapted to act through the spring mounting means to urge the pressure plate into clutching engagement with the driven member, and centrifugally responsive means adapted to consecutively separate the pressure plate and the bearing plate from the spring mounting means, whereby to cause clutching engagement between the pressure plate and the driven member, and yielding retracting means adapted to normally hold the pressure plate and the bearing plate against the spring mounting means.

9. An automatic clutch including driving and driven members, means for engaging said members comprising a pressure plate associated with the driving member and movable to clutch the driven member against the driving member, a spring backed member, normally positioned in predetermined relationship to the pressure plate, a bearing plate interposed between the pressure plate and the spring backed member, manually operable means for shifting said spring backed member to manually advance or retract said pressure plate, and means responsive to speed increments adapted to successively advance the pressure plate and bearing plate relative to the spring backed member, whereby to cause progressively increasing clutching pressure between the pressure plate and the driven member when the manually operable means is in a predetermined intermediate position.

10. An automatic clutch including driving and driven member, means for engaging said members comprising a pressure plate associated with the driving member and movable to clutch the driven member against the driving member, a spring backed member normally positioned in predetermined relationship to the pressure plate, a bearing plate interposed between the pressure plate and the spring backed member, retracting means adapted to yieldingly hold the pressure plate and bearing plate against the spring backed member, manually operable means for shifting said spring backed member to manually advance or retract said pressure plate, and means responsive to speed increments adapted to successively advance the pressure plate and bearing plate relative to the spring backed member, whereby to cause progressively increasing clutching pressure between the pressure plate and the driven member when the manually operable means is in a predetermined intermediate position.

11. An automatic clutch including driving and driven members, means for engaging said members comprising a pressure plate associated with the driving member and movable to clutch the driven member against the driving member, a spring backed member normally positioned in predetermined relationship to the pressure plate, a bearing plate interposed between the pressure plate and the spring backed member, and means responsive to speed increments adapted to successively advance the pressure plate and bearing plate relative to the spring backed member, whereby to cause progressively increasing clutching pressure between the pressure plate and the driven member.

12. An automatic clutch including driving and driven members, means for engaging said members comprising a pressure plate associated with the driving member and movable to clutch the driven member against the driving member, a spring backed member normally positioned in predetermined relationship to the pressure plate, a bearing plate interposed between the pressure plate and the spring backed member, and means responsive to speed increments adapted to successively advance the pressure plate and bearing plate relative to the spring backed member, whereby to cause progressively increasing clutching pressure between the pressure plate and the driven member, and retracting means adapted to yieldingly hold the pressure plate and bearing plate against the spring backed member.

13. An automatic clutch including driving and driven members, a pressure plate carried by the driving member and movable to engage the driven member, a spring loaded member backing up the pressure plate, a bearing plate interposed between the pressure plate and the spring loaded member, and centrifugally responsive weights engaged between the pressure plate and the spring loaded member and between the bearing plate and said member, said weights being adapted to advance said pressure plate into engagement with the driven member and to transfer the spring load from said spring loaded member to said pressure plate to secure a predetermined clutch engaging pressure over a predetermined slip range or speed increase.

14. An automatic clutch including driving and driven members, a pressure plate carried by the driving member and movable to engage the driven member, a spring loaded member backing up the pressure plate, a backing plate interposed between the pressure plate and the spring loaded member, means for manually shifting said spring loaded member to engage or disengage the clutch, and centrifugally responsive weights engaged between the pressure plate and the spring loaded member and between the backing plate and said member, said weights being adapted to advance said pressure plate into engagement with the driven member and to transfer the spring load from said spring loaded member to said pressure plate to secure a predetermined clutch engaging pressure over a predetermined slip range or speed increase.

15. An automatic clutch including driving and driven members, a pressure plate carried by the driving member and movable to engage the driven member, a spring loaded member backing up the pressure plate, a backing plate interposed between the pressure plate and the spring loaded member, spring retracting means for separately retracting the pressure plate and the backing plate against the spring loaded member, and centrifugally responsive weights engaged between the pressure plate and the spring loaded member and between the backing plate and said member, said weights being adapted to advance said pressure plate into engagement with the driven member and to transfer the spring load from said spring loaded member to said pressure plate to secure a predetermined clutch engaging pressure over a predetermined slip range or speed increase.

16. An automatic clutch including driving and driven members, a pressure plate carried by the driving member and movable to engage the driven member, a spring loaded member backing up the pressure plate, a backing plate interposed between the pressure plate and the spring loaded member, and centrifugally responsive weights engaged between the pressure plate and the spring loaded member and between the backing plate and said member, said weights being adapted to advance said pressure plate into engagement with the driven member and to transfer the spring load from said spring loaded member to said pressure plate to secure a predetermined clutch engaging pressure over a predetermined slip range or speed increase, means for manually shifting said spring loaded member to engage or disengage the clutch, spring retracting means for separately retracting the pressure plate and the backing plate against the spring loaded member.

HAROLD NUTT.